July 23, 1957 R. C. FERGASON 2,800,028
VEHICLE PROPELLING AND IMPLEMENT DRIVE MECHANISM
Original Filed Sept. 10, 1949 4 Sheets-Sheet 1
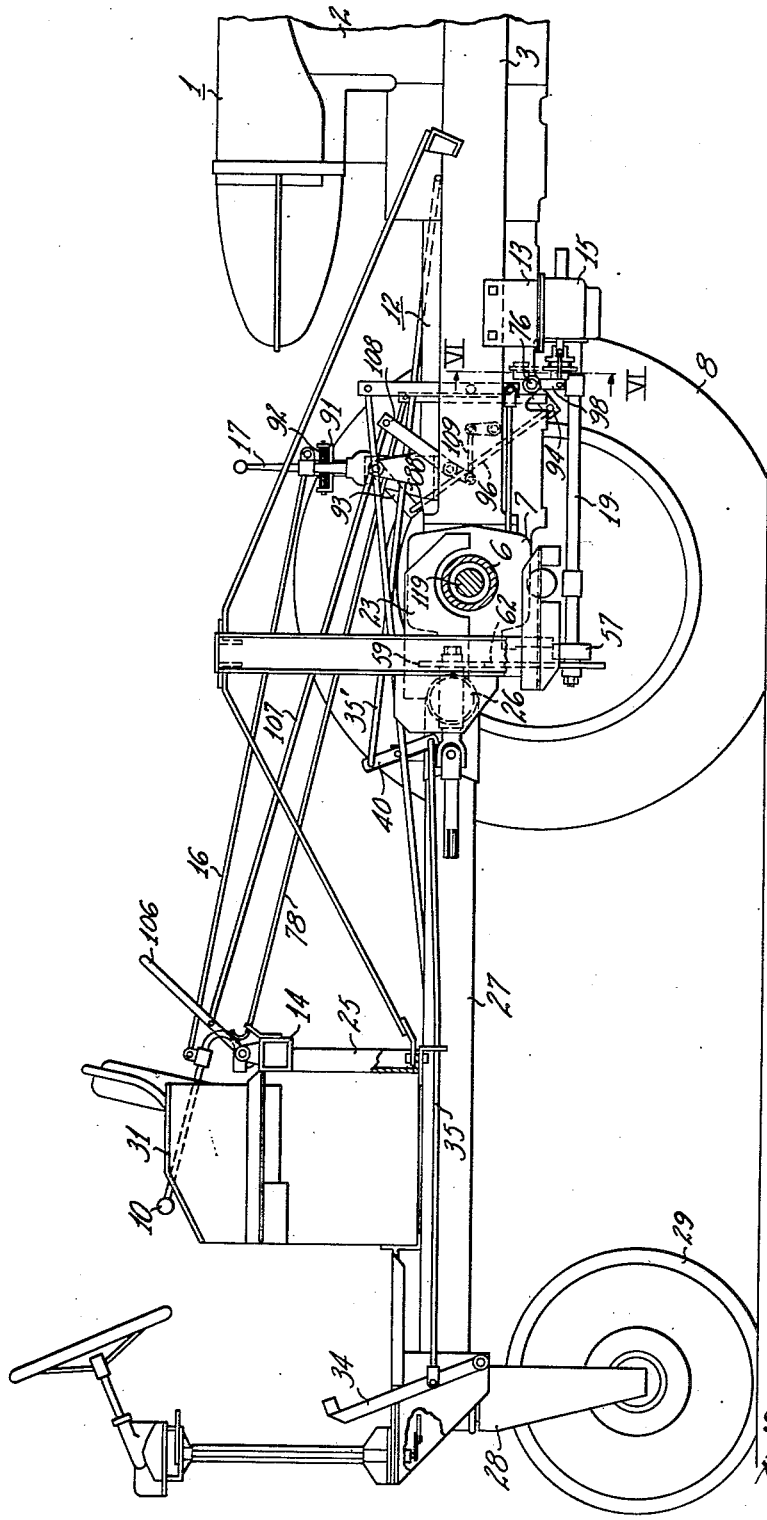

July 23, 1957   R. C. FERGASON   2,800,028
VEHICLE PROPELLING AND IMPLEMENT DRIVE MECHANISM
Original Filed Sept. 10, 1949   4 Sheets-Sheet 2
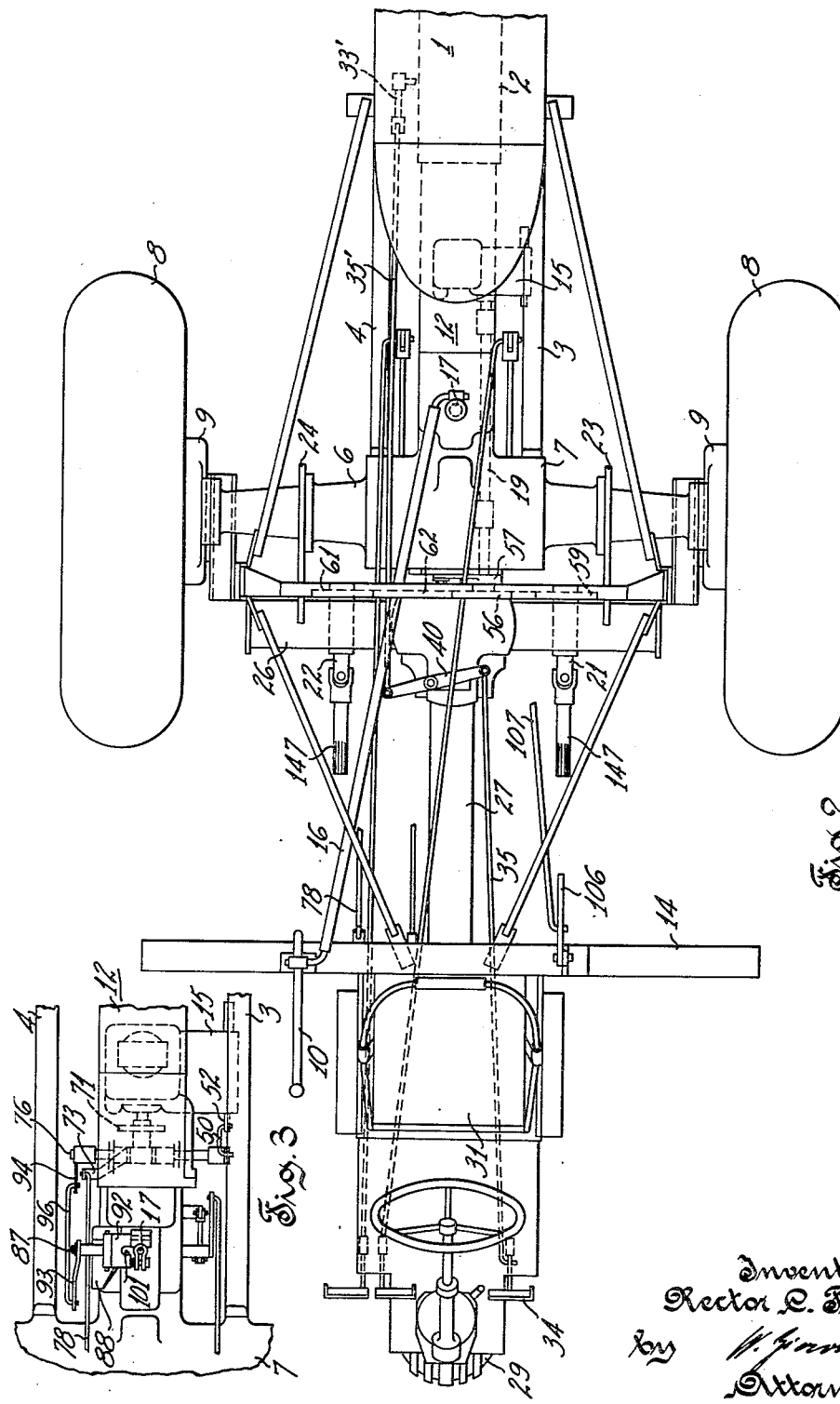

July 23, 1957 R. C. FERGASON 2,800,028
VEHICLE PROPELLING AND IMPLEMENT DRIVE MECHANISM
Original Filed Sept. 10, 1949 4 Sheets-Sheet 3

Inventor
Rector C. Fergason
by
Attorney

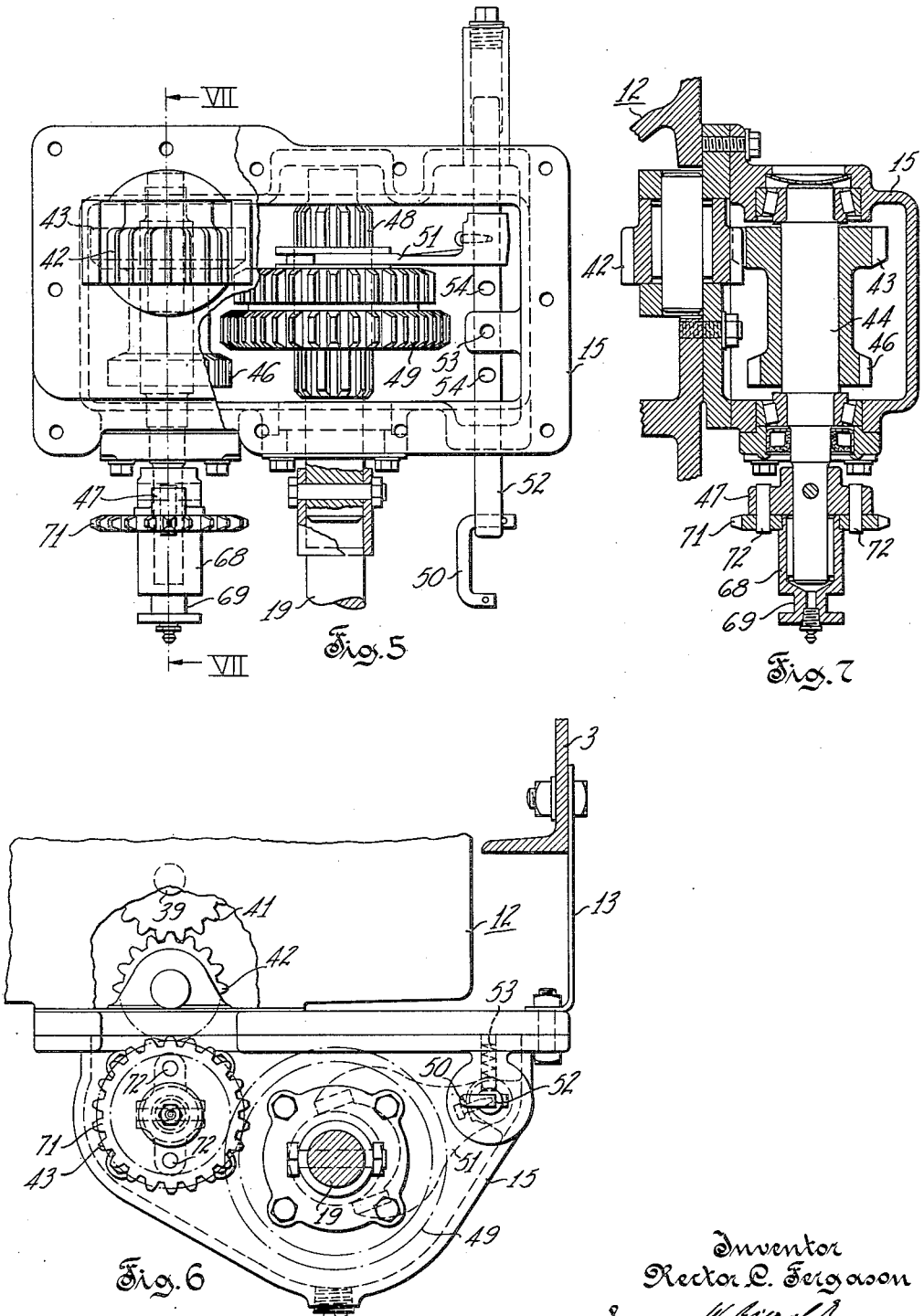

United States Patent Office 2,800,028
Patented July 23, 1957

2,800,028

VEHICLE PROPELLING AND IMPLEMENT DRIVE MECHANISM

Rector C. Fergason, Gadsden, Ala., assignor to Allis-Chalmers Manufacturing Company, Milwaukee, Wis.

Original application September 10, 1949, Serial No. 114,969, now Patent No. 2,671,298, dated March 9, 1954. Divided and this application March 4, 1954, Serial No. 414,016

6 Claims. (Cl. 74—15.4)

The invention relates to motor vehicles, and it is concerned more particularly with a power take-off mechanism for supplying external machinery, such as a tractor mounted implement unit, or a number of such units, with power from the vehicle engine. The present application is a division of application Serial No. 114,969, filed September 10, 1949, for Cotton Picker, and on which U. S. Patent No. 2,671,298 has issued on March 9, 1954.

Self-propelled agricultural implements which are equipped with a change speed transmission and with a power take-off driven implement unit are sometimes operated under conditions which make it desirable to synchronize the operating speed of the implement unit with the ground speed of the vehicle irrespective of whether the change speed transmission is operated in one gear or another. In cotton harvesters of the rotary spindle type, for instance, it is usual to provide a change speed transmission for selecting different vehicle speeds, and a power take-off mechanism for moving an endless series of spindle slats about an oblong path on the machine while the latter is propelled at different ground speeds. In such machines as heretofore constructed the power take-off mechanism is usually geared to the output shaft of the change speed transmission and the gear ratio of the power take-off mechanism is so proportioned that the spindle slats move rearward through a picking tunnel at one side of the oblong path at the same rate of speed as that at which the harvester travels forward when the change speed transmission is in any selected forward speed gear. By synchronizing the rearward spindle travel with the forward harvester travel, the rotating picking spindles will remain in the individual cotton plants for a maximum length of time while the harvester is propelled along the rows of cotton plants, as is well known in the art.

If the picking units are driven from the variable speed shaft of the transmission in the described manner, a clutch or other disengageable driving connection is usually provided and such a clutch may be disengaged so that the spindle slats will not be raced about their oblong paths when the transmission is operated in high gear for transport purposes. Should the spindle drive be engaged accidentally when the transmission is in high, damage to the picking units may result. On the other hand, when the machine is operated in low gear for picking, the change speed transmission must not only handle the propelling power for the vehicle but also the driving power for the picking units, which is an undesirable condition since the amount of power necessary to operate the picking units is usually considerable. In order to overcome these difficulties, attempts have been made during the past to drive the picking units directly from the engine rather than from the variable speed shaft of the transmission. Such attempts, however, have failed to provide a satisfactory solution of the problems involved, particularly in the matter of synchronizing the rearward spindle speed of the picking unit with the forward ground speed of the vehicle.

Generally, it is an object of this invention to provide an improved power transmitting mechanism for self-propelled cotton harvesters and other machines in which the speed of a power take-off driven implement can be synchronized with the ground speed of the vehicle.

More specifically, it is an object of this invention to provide an improved power transmitting system including a change speed transmission for a vehicle drive and a multiple speed power take-off mechanism for an implement drive, and which will be operative to automatically establish different gear ratios of the power take-off mechanism in response to the selection of different gear ratios of the change speed transmission.

A further object of the invention is to provide a power transmitting system of the outlined character which will be operative to automatically establish low and high gear ratios of the multiple speed power take-off mechanism upon shifting the change speed transmission to first and second speeds, respectively, and which will also automatically shfit the power take-off mechanism to neutral upon shifting of the change speed transmission into third or any other higher speed.

Another object of this invention is to provide a power transmitting system of the above outlined character which may be rendered selectively effective or ineffective to automatically vary the power take-off gear ratio in response to adjustment of the change speed transmission from one gear ratio to another.

Another object of this invention is to provide a power transmitting system of the above outlined character which is relatively simple but thoroughly satisfactory from a performance standpoint as well as from a manufacturing standpoint.

The foregoing and other objects and advantages are attained by the present invention, various novel features of which will be apparent from the description herein and the accompanying drawings, disclosing an embodiment of the invention, and will be more particularly pointed out in the appended claims.

Referring to the drawings:

Fig. 1 is a fractional side view of a cotton harvester chassis; picking units, cotton receiving basket and other parts being omitted for purposes of disclosure;

Fig. 2 is a plan view of the harvester chassis shown in Fig. 1;

Fig. 3 is an enlarged detail plan view of a change speed transmission, power take-off mechanism and interconnecting control linkage incorporated in the chassis shown in Figs. 1 and 2;

Fig. 5 is an enlarged detail view, in plan, of the power take-off mechanism incorporated in the chassis shown in Figs. 1 and 2, portions of the power take-off mechanism in Fig. 5 being broken away and others shown in section;

Fig. 6 is a section on line VI—VI of Fig. 1, showing an end view of the power take-off mechanism shown in Fig. 5; and Fig. 7 is a section taken on line VII—VII of Fig. 5.

Figure 4:
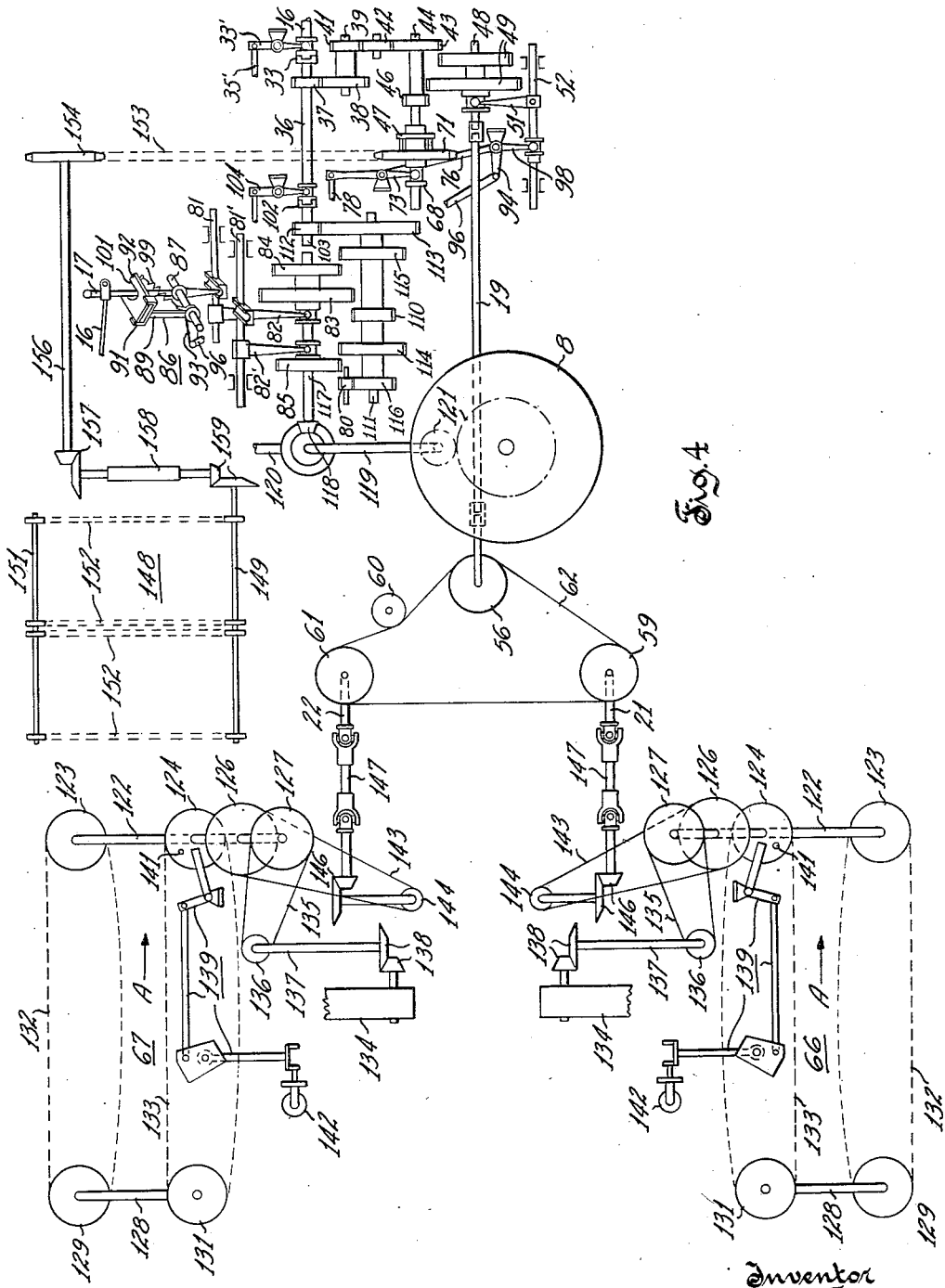
Fig. 4 is a diagrammatic showing of various components of a two-row cotton picker including the transmission, power take-off and control linkage shown in Figs. 1, 2 and 3.

Referring to Figs. 1 and 2, a tractor 1 has a rearwardly located engine 2 supported on frame members 3 and 4 which are joined at their forward ends to a transverse axle housing 6 and supported thereby as a cantilever beam. This axle housing is of the drop type and has a central or intermediate portion 7 between rear traction wheels 8, and depending final drive casings 9 on which the traction wheels 8 are rotatably mounted in conventional manner. A longitudinally extending housing structure 12 in rear of engine 2 and between the side frame members 3 and 4 of the tractor is connected at its rear end to the forward end of the engine and extends all the way forward to the central portion 7 of the axle housing 6 to which it is rigidly connected in conformity with conventional principles of tractor design. Bolted to the underside of longitudinal housing structure 12 and connected to the tractor side frame member 3 by means of a bracket plate 13 (Fig. 6) is a power take-off housing 15 which encloses auxiliary change speed gearing in the form of a multiple speed power take-off mechanism to which further reference will be made more fully hereinbelow.

Removably connected to axle housing 6 (Fig. 2) by means of a pair of tie plates 23 and 24 is a T-shaped extension frame having a transverse pipe portion 26 extending generally parallel in spaced relation to axle housing 6, and a longitudinally extending central frame member 27 having the forward end thereof connected to a front steerable support 28 (Fig. 1) mounting a ground engaging wheel 29. The longitudinally extending central frame member 27 and a forward transverse frame tube 14 are rigidly connected together by a suitable brace structure 25 (Fig. 1) which extends upwardly on the longitudinal frame member 27 and sustains the transverse frame tube 14 at a level above the longitudinal frame member 27, the elevated position of the transverse tube 14 being shown in Fig. 1. An operator's seat 31 is suitably supported above the central frame member 27 as shown in Fig. 1.

Referring to Fig. 4, the crankshaft of the tractor engine 2 has a forward end portion 16 appearing at the right of Fig. 4, and a master clutch 33 enclosed in the rearward part of housing structure 12 is connected to the engine shaft 16 in conventional manner, the clutch 33 being shown for reasons of simplicity as a jaw clutch although in actual construction a friction type master clutch would ordinarily be employed. The clutch 33 serves to selectively establish and interrupt a driving connection between the engine 2 and a clutch shaft 36 which in turn is selectively connectable with and disconnectable from the input shaft 103 of an ordinary change speed transmission affording three or more speeds and enclosed in the forward part of the housing structure 12 adjacent to the axle housing 6.

Master clutch 33 is controlled by a foot pedal 34 (Fig. 2) which is pivotally mounted adjacent the operator's station 31. Foot pedal 34 is connected by link 35 to a cross beam 40 pivotally mounted at its midpoint on frame member 27. The other end of cross beam 40 is pivotally connected to rod 35' operatively attached to an operating lever 33' of the master clutch 33. The transmission clutch 102 has an actuating arm 104 which, as shown in Figs. 1 and 2, is operable from the operator's seat by means including a hand lever 106, link 107, transfer lever 108, and link 109.

As shown in Fig. 4, the input shaft 103 of the change speed transmission is permanently connected to a transmission countershaft 111 through a pair of intermeshing gears 112, 113. A pair of gears 110, 115 on the countershaft 111 may be selectively engaged by a shiftable gear cluster 83, 84 to establish a relatively low and a somewhat higher forward speed of the transmission in conformity with conventional practice. The speeds afforded by meshing gears 83, 110 and gears 84, 115, respectively, are intended for driving the harvester at a low and at a somewhat higher picking speed.

The countershaft 111 additionally includes gears 114 and 116, the latter of which is in constant mesh with a reverse idler 80 rotatably mounted in transmission housing 12. The variable speed or output shaft 117 additionally includes shiftable gear 85 which is selectively engageable in conventional manner with reverse idler 80 to establish a reverse speed drive, or with gear 114 to establish a forward traveling speed which is substantially higher than the high picking speed.

The shiftable gear cluster 83, 84 and shiftable gear 85 are mounted on the output or variable speed shaft 117 of the change speed transmission, and the central portion 7 of the axle housing 6 encloses a conventional differential mechanism, not shown, which is connected with the transmission output shaft 117 through a ring gear and bevel pinion 118 in the usual manner. A half shaft 119 of the differential is connected with the traction wheel 8 at the left side of the machine through final reduction gearing 121, and the other half shaft 120 of the differential is connected with the traction wheel 8 at the right side of the machine through similar final reduction gearing, not shown.

The multiple speed power take-off mechanism which, as stated, is enclosed in housing 15, is driven, as shown in Fig. 4, from clutch shaft 36 through a constant mesh gear train comprising a driving gear 37 secured to clutch shaft 36 and a driven gear 38 keyed to a countershaft 39. Also keyed to countershaft 39 is reduction gear 41 which is in constant mesh with an idler gear 42 rotatively supported in power take-off housing 15. Idler gear 42 is also in constant mesh with a gear 43 keyed on a first power take-off shaft 44 which is rotatively supported in power take-off housing 15. Also keyed to the first power take-off shaft 44 is a gear 46 and a clutch element 47. The function of clutch element 47 will be more fully explained hereinbelow.

Rotatably mounted in power take-off housing 15 (Figs. 5 and 6) is a splined second shaft 48 having change speed gearing in the form of a double gear 49 slidably mounted thereon. Shift yoke 51 encircles a reduced portion of double gear 49 and is attached to a shift rod 52 slidably received in power take-off housing 15. Referring to Figs. 5 and 6, power take-off housing 15 has a spring biased detent 53 cooperable with indentations 54 in shift rod 52 to restrain shift rod 52 from being slid when the detent 53 is in engagement with one of the aforesaid indentations.

Referring again to Fig. 4, forward movement of shift yoke 51, that is to the left in Fig. 4, will cause double gear 49 to mesh with gear 46 on the first shaft 44 thereby rotating associated shaft 48 at a low or first power take-off speed. Rearward movement of shifting yoke 51, that is to the right in Fig. 4, will mesh double gear 49 with gear 43 thus providing a higher or second power take-off speed. It is readily seen that by shifting double gear 49 a range of two power take-off speeds may be selected.

As seen by reference to Figs. 1 and 2, a hand lever 10 for shifting the change speed transmission in the forward part of housing structure 12 is pivotally mounted on forward transverse frame tube 14 and is connected by means of link 16 to transmission gear shift member or lever 17. Shift lever 17 is universally mounted in the usual manner on transmission housing 12 and is selectively engageable with a rod 81 (Fig. 4) or with a similar shift rod 81', both of these shift rods being slidably mounted in an upper part of housing 12. Shift rod 81 has a yoke member 82 attached thereto which is operatively connected to transmission gear cluster 83 and 84, and shift rod 81' has yoke member 82' attached thereto and operatively connected with gear 85. Fig. 4 shows the gear cluster 83, 84 and the gear 85 in their neutral positions, and the shift rods 81, 81' are operable in conventional manner to move either the gear cluster 83, 84 or the gear 81 forwardly and rearwardly from its neutral into a drive establishing position. If it is desired to establish the hereinbefore mentioned reverse speed or the mentioned traveling speed, the gear shift lever 17 is swung about its universal pivot center in a direction transversely of the vehicle to engage the shift rod 81' and then backward or forward in conformity with the usual mode of operation of any ordinary handshifted car or truck transmission having a shiftable forward and reverse gear as shown at 85 (Fig. 4).

Control mechanism for the gearing includes the transmission gear shift lever 17 which is interconnected with the shift element or rod 52 of the power take-off mechanism in housing 15 so as to effect automatic shifting of the multiple speed power take-off mechanism from low to high when the change speed transmission is shifted from its low to its high picking speed, and also to effect automatic shifting of the multiple speed power take-off mechanism from high to low when the change speed transmission is shifted from its high to its low picking speed. The control mechanism further includes linkage or motion transmitting means for the purpose of automatic shifting as follows: a bell crank 86 (Fig. 4) is pivotally mounted on a stub shaft 87 carried by a bracket 88 (Figs. 1 and 3) attached to the transmission housing 12, the axis of stub shaft 87 passing through the pivot center of gear shift lever 17. Bell crank 86 includes an upstanding arm 89 which has a bifurcated bracket 91 at its upper end. Bifurcated bracket 91 supports a shift lever engaging means in the form of a vertically swingable plate or adjustable member 92 which is pivotally mounted on bracket 91 adjacent transmission gear shift lever 17. Plate 92 is provided with a notched recess 101 which partially encircles shift lever 17. The other arm 93 of bell crank 86 is pivotally connected to a reciprocable link 96 which, as shown in Fig. 1, extends downwardly and rearwardly from arm 93, and is pivotally connected at its lower end to a rockable structure including a forwardly and downwardly extending arm 94 on a transverse rock shaft 76. The rock shaft 76 has a depending arm 98 which is connected by a link 50 (Fig. 5) to the forward end of shift rod 52. In the diagrammatic view of Fig. 4 the depending arm 98 is shown for purposes of simplification, to directly engage a collar on shift rod 52.

Notched plate or part 92 is biased by an over center spring means 99 (Fig. 4) attached to bell crank 86 and to the free end of the notched plate 92. This spring 99 acts to maintain notched plate or adjustable member 92 in a position adjacent shift member 17 wherein the shift member 17 is disposed in the notched recess 101 when the transmission is adjusted to first or second picking speed. When the transmission is adjusted to traveling or reverse speed by rearward or forward adjustment, respectively, of the gear 85 from its neutral position the shift member 17 is pivoted away from the notched plate 92 and consequently the shift rod 52 of the multiple speed power take-off mechanism will remain in the neutral position in which it is shown in Fig. 4. Notched plate 92 can be moved by hand to an upwardly tilted inoperative position during transport or at any time it is desired to use the tractor but not to use the multiple speed power take-off.

The variable speed shaft 48 of the multiple speed power take-off mechanism can be driven at either a high or a low picking speed, as explained hereinbefore, and two picking units of generally conventional construction which are driven by the shaft 48 are outlined in Fig. 4 and designated by the reference characters 66 and 67, respectively. Each picking unit comprises a vertical drive shaft 122 having four sprocket wheels 123, 124, 126 and 127 secured thereto. A vertical shaft 128 forwardly of the shaft 122 has sprocket wheels 129 and 131 in alignment with sprocket wheels 123 and 124, respectively, and a pair of carrier chains 132 and 133 for an endless series of vertical spindle slats, not shown, are trained about sprockets 123, 129 and 124, 131 for travel in an oval path in the customary manner. The sprocket wheel 127 at the upper end of drive shaft 122 has a driving connection with a belt type cotton elevator 134 through a chain 135, sprocket wheel 136, vertical shaft 137 and bevel gears 138. A link and lever system generally designated 139 is actuated by a stud 141 on sprocket 124 and serves to operate a diaphragm type water pump 142 of a spindle moistening system, not shown.

The sprocket wheel 126 on shaft 122 of the picking unit 66 is driven from a power outlet shaft 21 by means of a chain 143, sprocket 144, bevel gears 146 and universal shaft 147; and the sprocket wheel 126 of the picking unit 67 is similarly driven from a power outlet shaft 22. The power outlet shafts 21 and 22 are mounted on the transverse frame tube 26 of the tractor as shown in Figs. 1 and 2, and carry sprocket wheels 59 and 61, respectively. A line shaft 19 is mounted on the tractor as shown in Fig. 1 below the axle housing 6 and transmission housing 12 and is rotatably supported at its forward end in a depending bracket 57 on differential housing 7. A sprocket 56 is secured to the forward end portion of shaft 19 forwardly of bracket 57 and, as best shown in Fig. 4, an endless chain 62 is trained about the sprockets 56, 59 and 61 for transmitting driving power from shaft 19 to power outlet shafts 21 and 22. A spring mounted idler sprocket 60 is suitably arranged as shown in Fig. 4, to tension the chain 62. The rear end of line shaft 19 is suitably coupled to the forward end of the variable speed shaft 48 of the multiple speed power take-off mechanism.

From the foregoing explanations it will be apparent that both picking units will be driven simultaneously at either a low picking speed or a high picking speed, depending on whether the shiftable gear cluster 49 on shaft 48 is meshed with low speed gear 46 or with high speed gear 43 on the first power take-off shaft 44. The reduction ratio afforded by engagement of cluster gear 49 with low speed gear 46 is such that the chains 132 and 133, and with them the spindle slats (not shown), will travel through the picking tunnel (not shown) in the direction of arrow A, that is, rearwardly, at the same rate of speed as that at which the harvester moves forward, that is to the left in Fig. 4, when the low speed gear 83 of the change speed transmission is engaged with the countergear 110. Likewise, the reduction ratio afforded by engagement of cluster gear 49 of the power take-off mechanism with the high speed gear 43 is such that the chains 132 and 133, and with them the spindle slats (not shown), will again travel through the picking tunnel (not shown) in the direction of arrow A at the same rate of speed as that at which the harvester moves forward when the high speed gear 84 of the change speed transmission is engaged with the countergear 115.

As explained hereinbefore, a change from either picking speed to the other by manipulation of shift lever 17 automatically effects a correlated speed change in the power take-off mechanism, as long as the notched plate 92 is in its operative, that is downwardly adjusted, position as shown in Fig. 4. The connection between hand lever 13 (Figs. 1 and 2) and gear shift lever 17 is such that the latter may be adjusted to its neutral or any of its drive establishing positions by manipulation of the hand lever 10 from the driver's seat. The system is entirely foolproof in that it is impossible for the operator to engage either the low or the high picking speed of the transmission without at the same time engaging the proper speed of the power take-off mechanism which will synchronize the rearward spindle travel with the forward harvester travel. If the change speed transmission is shifted to reverse or traveling speed the shiftable gear cluster 49 of the power take-off mechanism automatically remains in the neutral position in which it is shown in Fig. 4, while the notched plate 92 remains in its operative, that is downwardly tilted, position. In this manner any danger that the picking units may be raced at an unduly high speed when the transmission is shifted into a traveling speed, is completely avoided.

Referring once more to Fig. 4, a traveling floor conveyor for a cotton receiving basket is generally indicated at 148 and comprises a driving sprocket shaft 149, a driven sprocket shaft 151, and a number of endless conveyer belts 152 which are trained about the shafts 149 and 151. The sprocket shaft 149 is driven from the first or live power take-off shaft 44 by means of a sprocket wheel 71 on the shaft 44, a chain 153, sprocket 154, shaft 156, bevel gears 157, shaft 158 and bevel gears 159. The sprocket wheel 71 is rotatively and axially loose on shaft 44 and can be shifted into and out of cooperative engagement with the hereinbefore mentioned clutch member 47 which is secured in an axially fixed position to shaft 44 for rotation in unison therewith.

As more clearly shown in Figs. 5 and 7, the sprocket wheel 71 has a hub sleeve 68 which is rotatably and shiftably mounted on the forward end of shaft 44. Two diametrically opposed clutch pins 72 project axially from clutch member 47, and the sprocket wheel 71 has a pair of holes into which the pins may enter to transmit torque from clutch member 47 to sprocket wheel 71. A shifter fork 73 (Fig. 4) for the sleeve 68 engages a circumferential groove 69 in the latter and is pivotally mounted for back and forth movement on a transverse axis.

An actuating rod 78 for the clutch shifter fork 73 is pivotally connected at its rear end to the latter, and is slidably supported at its forward end (see Figs. 1 and 2) on the transverse frame tube 14 in proximity to the operator's seat 31. A small hook at the forward end of rod 78 serves as a handle to shift the rod back and forth and thereby disengage and engage the drive for the basket floor conveyer 148. It will be noted that the basket floor conveyer can be operated for unloading the basket while the harvester is standing still and while the spindle slat carrying chains 132, 133 are at rest. For that purpose power may be applied from the engine 2 to the clutch shaft 36 through master clutch 33 while the change speed transmission is in neutral. The transmission clutch 102 may be additionally disengaged, if desired.

It should be understood that it is not intended to limit the invention to the particular forms and details herein shown and described, and that the invention includes such other forms and modifications as are embraced by the scope of the appended claims.

It is claimed and desired to secure by Letters Patent:

1. In a tractor mounted live power take-off operated cotton picker having spindles traveling rearwardly at generally the same rate as the forward tractor ground speed and including other power take-off operated mechanism, a gear shift lever carried by said tractor and operable to shift a change speed transmission, the improvement comprising a first shaft carried by said power take-off and operatively connected to the engine of said tractor for operation thereby, said other mechanism being driven by said first shaft, a second shaft carried by said power take-off, change speed gearing carried by said second shaft and being shiftable to mesh with gears on said first shaft to provide two forward speeds and a neutral position, a pivoted member having a slot therein adapted to partially encircle said shift lever for movement therewith to any one of three positions, and means connecting said pivoted member and said change speed gearing whereby when said gear shift lever is actuated to shift said change speed gearing to first speed said pivoted member is actuated to shift the gears on said second shaft to operate said second shaft in first speed, when said gear shift lever is actuated to shift said change speed gearing to second speed said pivoted member is actuated to shift the gears on said second shaft to operate said second shaft in second speed and when said gear shift lever is shifted to any position other than first or second speed the gear shift lever disengages from the slotted portion of said pivoted member thereby retaining said gears on said second shaft in a neutral position, said cotton picker being operatively connected to said second shaft.

2. In a tractor-implement combination wherein the tractor includes a live power take-off and change speed gearing provided with a shift means having a neutral position and positions for selecting at least three speed ranges and wherein the implement is operatively connected to the live power take-off, the improvement comprising an auxiliary change speed gearing incorporated in the connection between said implement and said live power take-off, a shift element controlling said auxiliary gearing and being movable to a neutral position and to positions affording a selected one of two forward speed ranges, and means for operatively interconnecting and disconnecting said shift means and shift element, said means comprising an adjustable member partially encircling said shift means for movement therewith and linkage means connecting said adjustable member and shift element, said adjustable member and linkage being in operable relation with said shift means through some of said speed range selecting movements to effect corresponding movements of said shift element and in inoperable relation to said shift means through other speed range selecting movements.

3. In a motor vehicle having a change speed transmission including a shift member operable to shift said transmission to at least three speeds and a multiple speed power take-off including a shift element operable to shift said power take-off to less than three speeds, the improvement comprising linking means interconnecting said shift member and said shift element for simultaneous movement, said linking means being so constructed, mounted and arranged as to automatically shift said power take-off when said transmission is shifted to some of its selected speeds and to maintain said power take-off in a neutral condition when said transmission is shifted to other selected speeds.

4. The combination of claim 3 in which the linkage means comprises a bell crank lever, shift member engaging means attached to one arm of said bell crank lever and positioned for releasable engagement with said shift member so as to be actuated by a predetermined speed selecting movement of the latter and so as to become disengaged from said shift member upon another predetermined speed selecting movement of the latter, a rockable structure having two lever arms, a connecting link pivotally attached at one of its ends to the other arm of said bell crank lever and at its other end to one arm of said rockable structure, and another link connecting the other arm of said rockable structure with said power take-off shift element.

5. The combination of claim 4 wherein said shift member engaging means comprise a notched part pivotally attached to said one arm of said bell crank lever, said notched part being pivotable to an operative position engaging said shift member and to an inoperative position remote from said shift member, and biasing means operative to releasably retain said notched part in either said operative or in said inoperative position.

6. In a motor vehicle, the combination of a change speed gearing, a control mechanism for said gearing including a shift member mounted for selective adjustment to a neutral position and to at least two drive establishing positions; power take-off mechanism including a shift element mounted for selective adjustment to a neutral position and to a drive establishing position; and motion transmitting means operatively associated with said shift member and with said shift element in connectable and disconnectable relation to each other so that adjustment of said shift member into one of said drive establishing positions will actuate said motion transmitting means to effect corresponding movement of said shift element and so that adjustment of said shift member into the other of said drive establishing positions will be ineffective to move said shift element from its neutral position.

References Cited in the file of this patent

UNITED STATES PATENTS

| 2,428,647 | Boyer | Oct. 7, 1947 |
| 2,438,539 | Cook | Mar. 30, 1948 |
| 2,672,056 | Stone | Mar. 16, 1954 |